United States Patent [19]

Kubono et al.

[11] Patent Number: 4,593,996
[45] Date of Patent: Jun. 10, 1986

[54] READER-PRINTER

[75] Inventors: Shunji Kubono, Kanagawa; Ushio Anayama, Ayase, both of Japan

[73] Assignee: Fuji Photo Film Co., Ltd., Kanagawa, Japan

[21] Appl. No.: 594,579

[22] Filed: Mar. 29, 1984

[30] Foreign Application Priority Data

Mar. 31, 1983 [JP] Japan .............................. 58-45810[U]
Aug. 23, 1983 [JP] Japan ................................. 58-152561

[51] Int. Cl.⁴ ...................... G03G 15/00; G03B 27/54
[52] U.S. Cl. .......................................... 355/5; 355/67; 355/71
[58] Field of Search ................... 355/5, 44, 45, 55–57, 355/66, 67, 71, 51; 350/247, 315, 317, 318, 448

[56] References Cited

U.S. PATENT DOCUMENTS 4,272,186 6/1981 Plummer ............................ 355/71 X
4,298,274 11/1981 Rees et al. ............................... 355/71
4,339,182 7/1982 Ueda et al. .......................... 355/45 X Primary Examiner—Arthur T. Grimley
Assistant Examiner—C. Romano

[57] ABSTRACT

A compact reader/printer that has an electrophotographic copier which copies image data recorded on a recording medium on a copy medium for enlargement. The optical path extending from the recording medium is guided by a mirror to an exposure surface. The mirror is provided in inclination to the exposure surface at a location close thereto. The reader/printer is advantageous in that the illumination toward the exposure surface is made uniform by a filter, a mirror for varying reflection by location, a partial shading plate or the like. They are inserted in the optical path to diminish the intensity of light in the region where the distance between the mirror and the surface is narrow.

10 Claims, 10 Drawing Figures

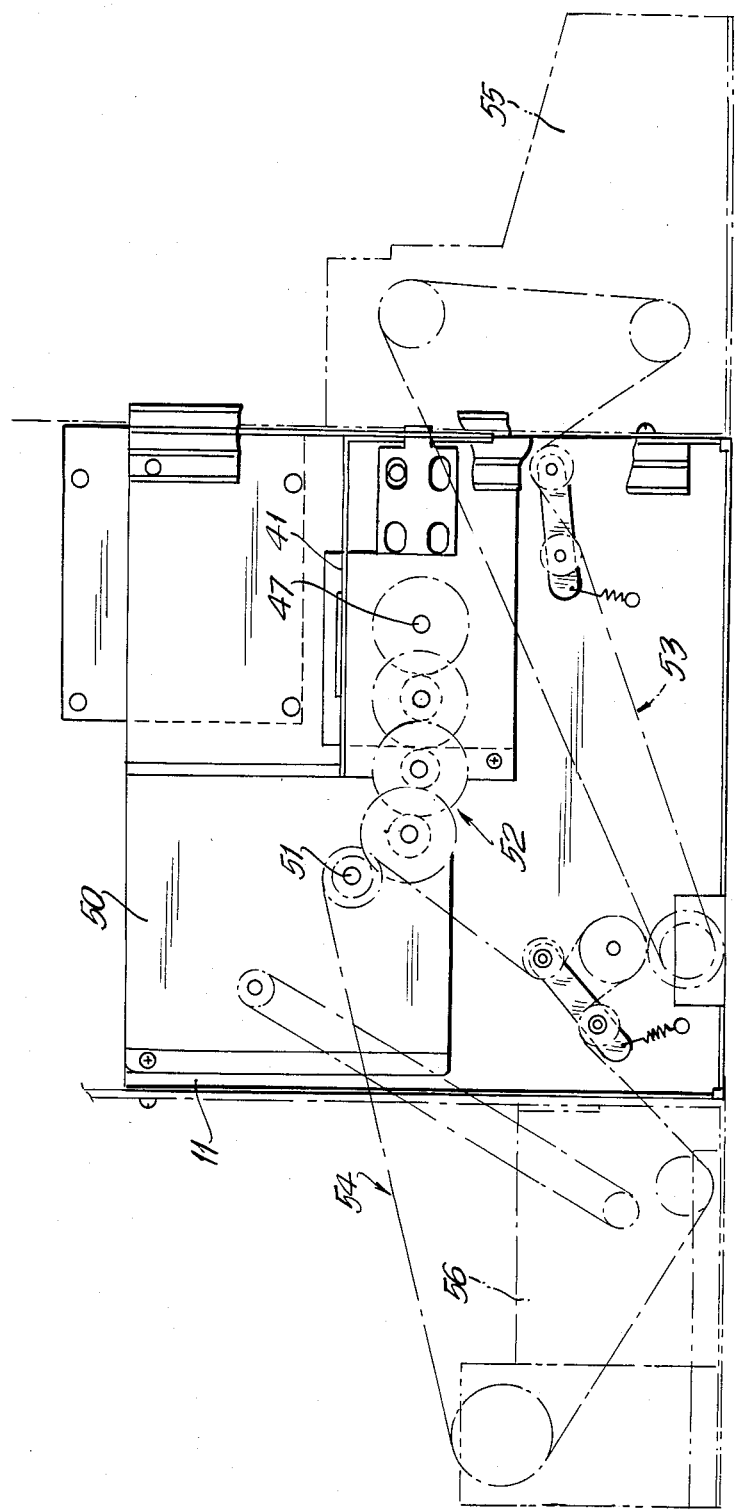

READER-PRINTER

TECHNICAL FIELD OF THE INVENTION

This invention relates to a reader-printer which projects image information recorded on a recording medium on a screen or duplicates such information in enlarged form on a copy medium.

TECHNICAL BACKGROUND OF THE INVENTION

A reader-printer has been known as an apparatus for projecting picture image data recorded on a microfilm of a roll, fiche, apertured card, or jacket form on a screen or for copying in magnification such data on a copy medium such as paper in enlarged size. An electrophotographic copier is generally used as a printer. In order to reduce the size, the weight and the cost of such a reader-printer, there has been proposed a device where one lens serves the dual purpose of projection and copy and one light source is used for all. FIG. 1 is a schematic view of a conventional reader-printer. Inside a lamp housing 12 formed in the lower front side of a main body 11 are provided a lamp 13 and a mirror 14 which reflects upward the light emitted from the lamp 13. A film operation space 16 where a microfilm 15 is positioned is formed above the lamp housing 12. A condenser 17 which guides the light from the lamp 13 to the microfilm 15 is secured immediately above the mirror 14 in a manner so as to partly project into the space 16. A fixed mirror 19 is tilted above a lens 18 for projection and copying so as to redirect the optical path to the rear portion of the body 11. Lens 18 opposes the condenser 17 to hold the microfilm 15 therebetween. A switching mirror 22 is rotatably provided around a shaft 23 of the body 11 and behind the mirror 19 in order to switch the optical path from the fixed mirror 19 to either the side of a projection screen 20 on the front upper portion of the body 11 or the side of the exposure surface 21 of an electrophotographic copier (not shown) on the lower rear portion of the body 11. A mirror 24 is also secured in inclination to redirect the optical path from the first mirror 19 to the side of the exposure surface 21. A mirror 25 is fixed above the switching mirror 22 for redirecting the optical path from the mirror 19 via the mirror 22 to the side of the screen 20. Said electrophotographic copier is adapted to pass intermittently a sheet of electrophotosensitive paper 26 consecutively through a charging section, an exposure section, a development section and a fixing section by means of a driving mechanism (not shown). Image data recorded on a microfilm 15 is projected and exposed on the surface 21 in magnified size. Similar structure is applicable basically to the reader-printer housing the type of electrophotographic copier which transfers image data of a microfilm 15 on a plain paper via an electrophotosensitive member. As the size of such reader-printers have been diminished more and more, the length of the optical path extending from the microfilm 15 to the screen 20 and the exposure surface 21 must be shortened. This inevitably makes the mirror 24 positioned extremely close to the exposure surface 21. Due to the diffuse reflection on the surface of the electrophotographic paper 26 on the surface 21, the illuminance of the rear portion (the right end portion in the figure) of the paper 26 which is close to the mirror 24 increases. The density in picture images will therefore vary inconveniently between the rear portion and the less influenced portion (the left end portion in the figure). Such a detractive aspect will appear more conspicuously on electrophotographic paper which has a diffuse reflection surface due to zinc oxide coating or in a system where picture images are directly copied, than in a system including a transfer step.

SUMMARY OF THE INVENTION

The present invention relates to the type of reader-printer wherein a mirror is provided in inclination extremely close to an exposure surface of an electrophotographic copier in order to guide an optical path from the recording medium. The present invention aims at providing a novel reader-printer which can copy picture images of a higher quality by substantially equalizing the illuminance distribution on the exposure surface.

In order to achieve such an object, the reader-printer according to this invention comprises a copy/projection lens which is provided on a main body for enlarging image information recorded on a recording medium, a projection screen which is provided on said main body to be projected with said image data, an electrophotographic copier housed in said main body and having an exposure surface where said image data is focused in enlargement, a switching mirror which is provided on said main body and which switches the optical path from said copy/projection lens to either the side of said screen or the side of said exposure surface and a mirror which is provided on said main body in a manner to incline toward said exposure surface, and the reader-printer has the feature that a means is inserted in the optical path in order to partially diminish the amount of light on the exposure region which is closer to said mirror.

BRIEF DESCRIPTION OF THE DRAWINGS

FIG. 10 is a schematic view of the driving mechanism of the drive.

DETAILED DESCRIPTION OF PREFERRED EMBODIMENTS

Description will now be given in more detail to an application of this invention for a reader-printer housing a switching device for a conversion lens, referring to FIGS. 3 through 10.

Figure 1:
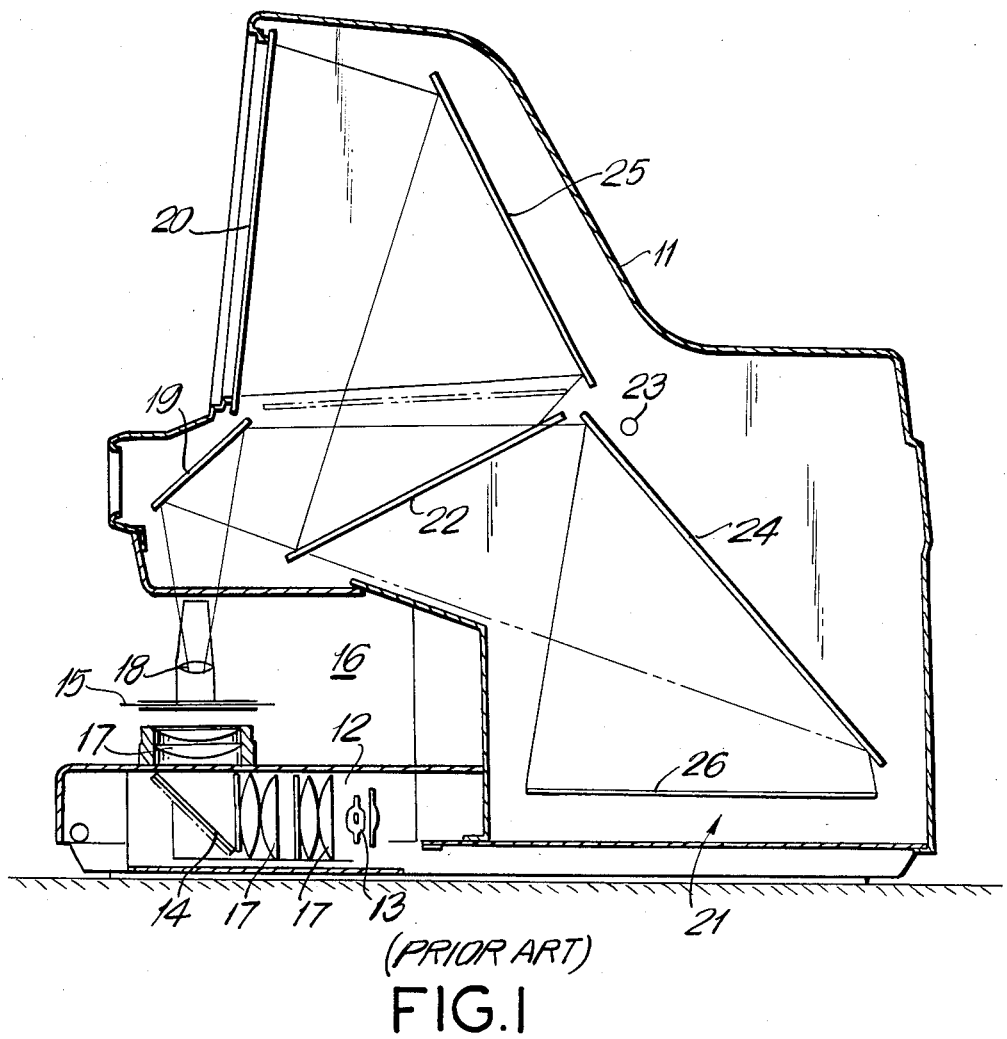
FIG. 1 is a cross sectional view to show the schematic structure of a conventional reader-printer.
Figure 2:
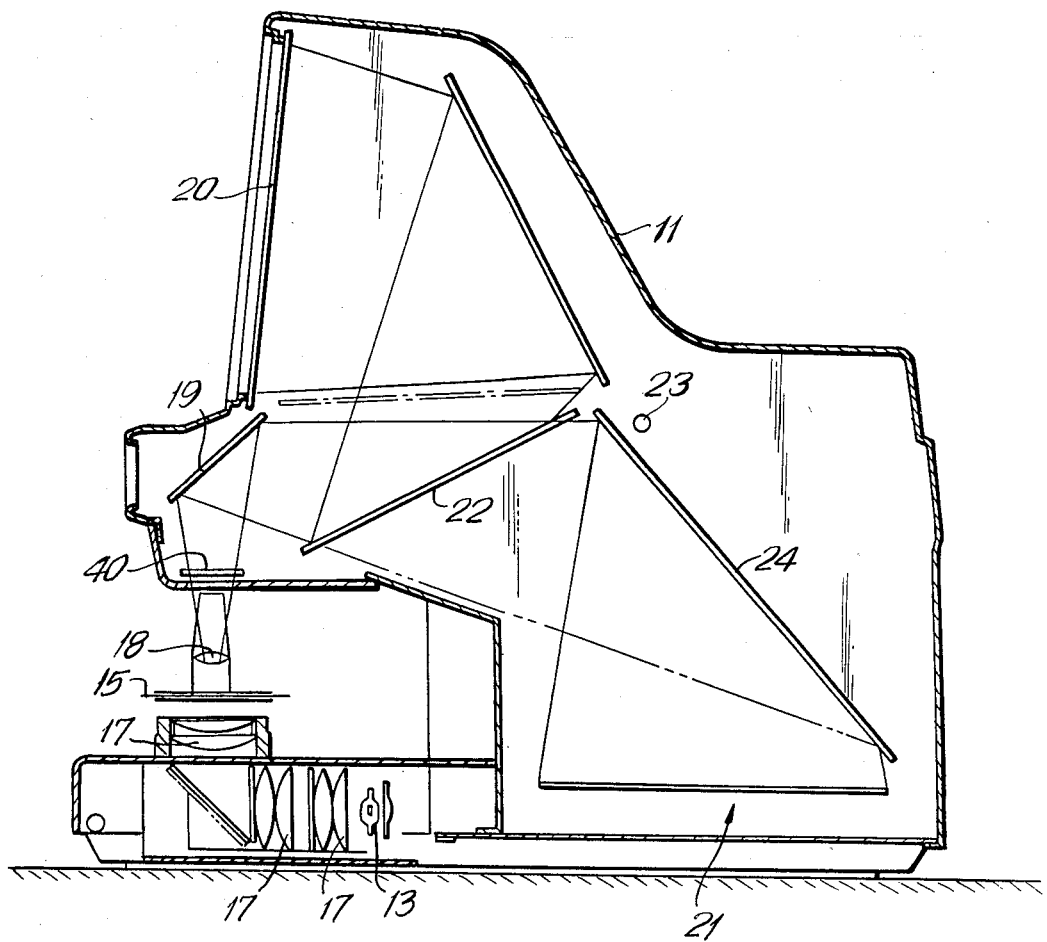
FIG. 2 is an application of the reader-printer according to the present invention to the device which houses a switching mechanism for a conversion lens.
Figure 3:
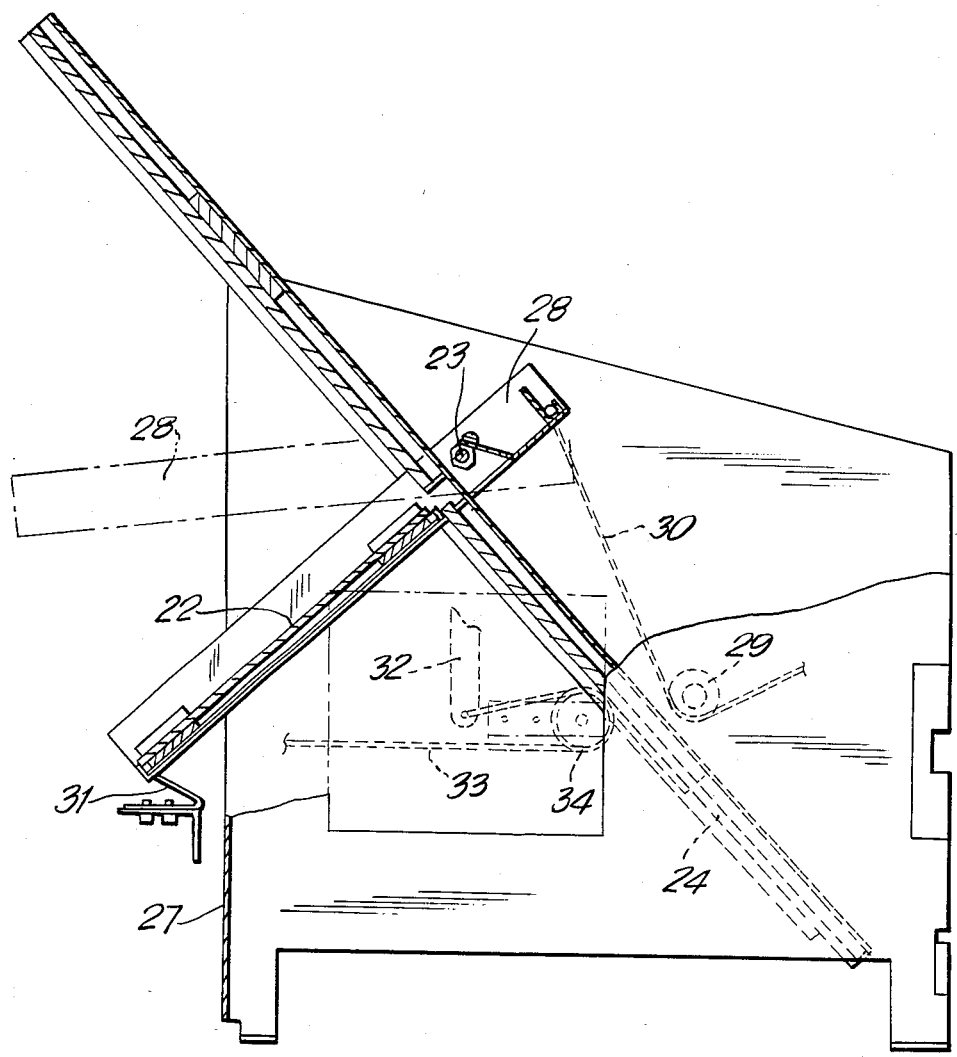
FIG. 3 is a schematic view to show a partial enlargement of the switching mirror.
Figure 4:
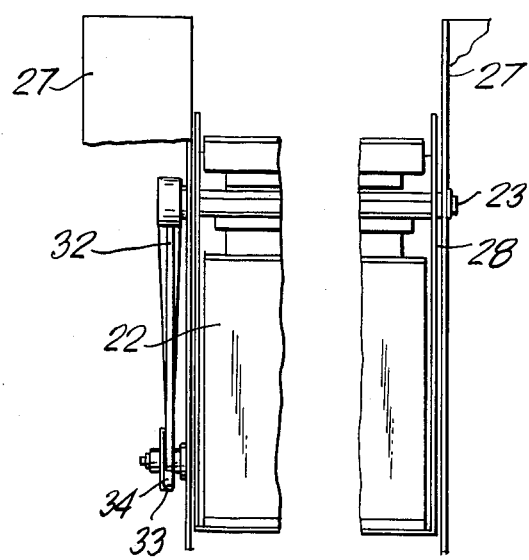
FIG. 4 is an exploded view of the left side surface thereof.

As shown in FIG. 2 through 4, a rotatable shaft 23 is journaled on a frame 27 which is integral to a main body 11. A frame 28 is integrally secured to the shaft 23 to support a switching mirror 22. A wire 30 is connected to the frame 28. The wire 30 is also connected to a driving source (to be described hereinafter) via a directional roller 29. The frame 28 is positioned to abut on a stopper 31 normally by its own weight but at the time of copy, it is pulled up to the position shown by alternate long and two short dashes line in the figure as the wire 30 is forced down by the driving mechanism which is actuated by a switch (not shown). A swingable lever 32 is integrally attached to said rotatable shaft 23. A wire 33 is connected to the lever 32 on one end thereof, suspended on a directional roller 34 and connected to a slide base 35 (which is described hereinafter).

Figures 5, 6:
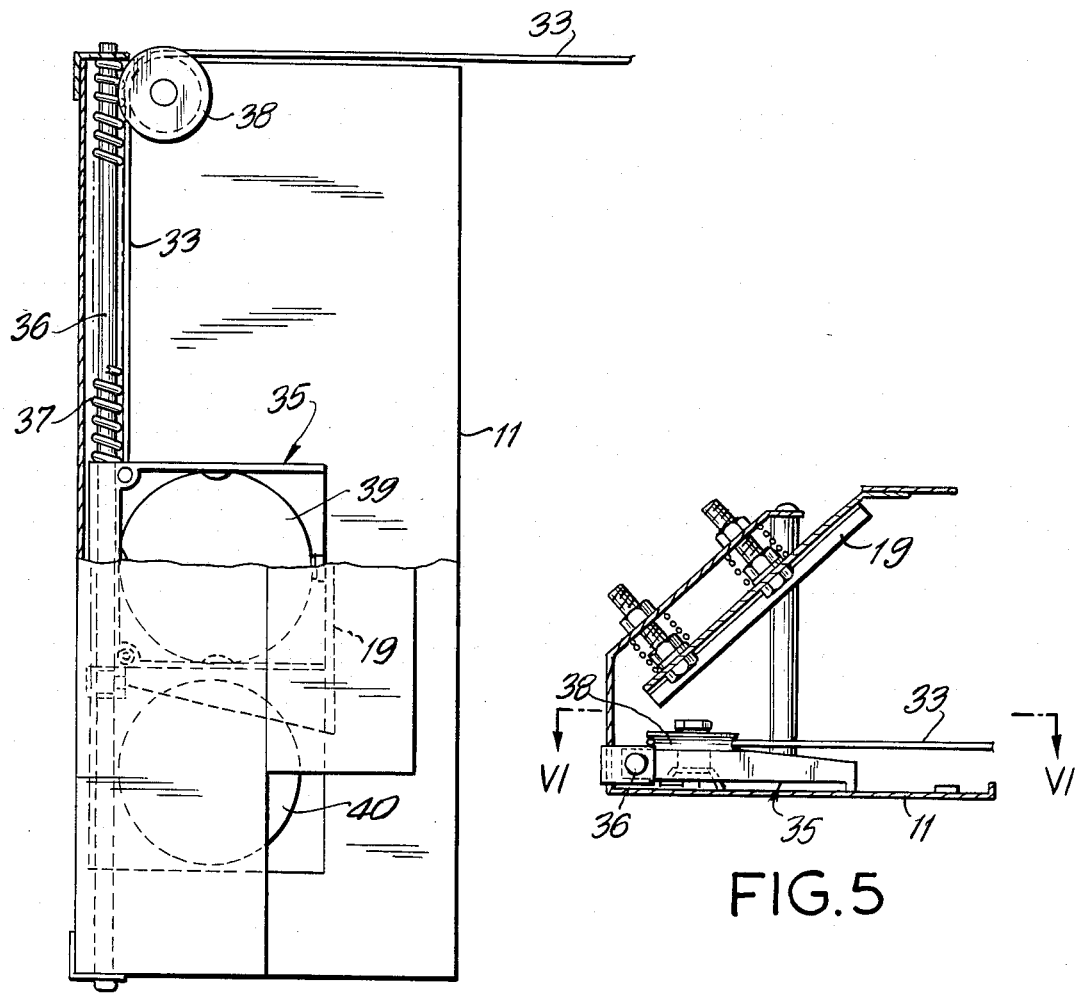
FIG. 5 is a schematic view of a partial enlargement of the fixed mirror thereof.
FIG. 6 is a cross section thereof along the line VI—VI of FIG. 5.

As shown in FIGS. 5 and 6, the slide base 35 is carried on the main body 11 immediately below a fixed mirror 19 in a manner to slide across the optical path at a right angle extending from a lens 18 to the fixed mirror 19 along a guide bar 36 which is fixed on the main body 11. A compression spring 37 is inserted through the guide bar 36 in order to press down the slide base 35 in FIG. 6 so that when the frame 28 is pulled up for the operation, the swingable leve 32 which is integral with the frame 28 is rotated clockwise to pull the wire 33, thereby moving the slidable base 35 in a horizontal direction or upward in FIG. 6, overcoming the force of the compression spring 37. The reference numeral 38 denotes a directional roller for the wire 33. A conversion lens 39 and a partial neutral density filter 40 which partially diminishes the light intensity are provided in parallel to each other on the slide base 35. The conversion lens 39 is positioned immediately below the mirror 19 for projection while the filter 40 is positioned immediately below the mirror 19 for copying to partially diminish the light. The conversion lens 39 is used to project the image data recorded on a microfilm 15 on a screen 20 in either larger or smaller size. The filter 40 is used to diminish the light about 15% in the 40% area which is called the rear portion of the exposed surface (the right portion in FIG. 2), where the distance between the mirror 24 and the filter is narrowed. The diminished light region or the density of the filter 40 may be arbitrarily selected. The light diminution ratio may be varied either stepwise or continously. In case a simple shading plate is used, it is preferable to interpose it between the lamp 13 and a condenser 17 so as to blur the boundary. It is possible to use another means for light diminution which diminishes the reflectance of the mirror 24 increasingly as the distance to the exposed surface 21 is narrowed.

In the case of the reader-printer according to this invention, the power of the lamp 13 should be increased as much as possible in order to make the image data (on the screen) easier to see. However, as the exposure illuminance will be increased excessively if the lamp 13 is increased in intensity, it becomes extremely difficult to control the light density at an optical rate. Especially in the case of the reader-printer which magnifies a projected image to larger than life-size as the projected image becomes dark in proportion to the ratio of magnification, the power of the lamp 13 should be increased to a great extent, but this makes the control of the exposure extremely difficult for copying. In the case of a reader-printer which reduces a projected image to a smaller size than the copied image, a similar problem arises as it is often incorporated with an electrophotographic copier using a highly sensitive electrophotosensitive material.

According to this invention, the illuminance is prevented from being too bright at the time of copying and from being too dark at the time of projection by providing the conversion lens 39 and the filter 40 in parallel and increasing the density of the filter 40. This invention is effective even if the conversion lens 39 is omitted. It may be left as a simple hole. Although the slide base 35 is movable by the wire 33 in a connecting relation with the mirror 22 in the above description, other known driving means may be utilized. It should be noted that no driving means are required for the type where the reflectance of the copying mirror 24 is varied.

Figure 7:
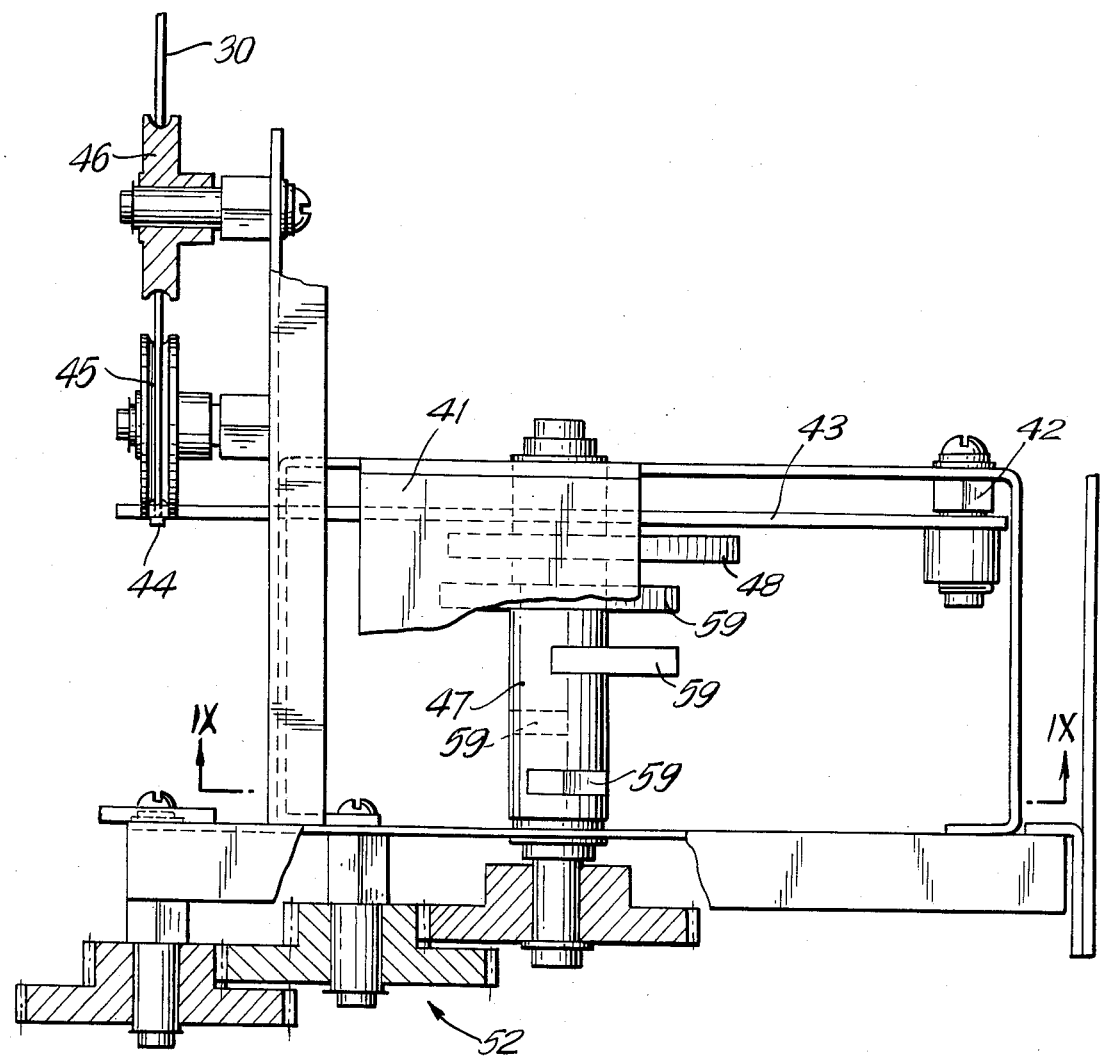
FIG. 7 is a plan view of a partial explosion of the part around a cam shaft.
Figure 8:
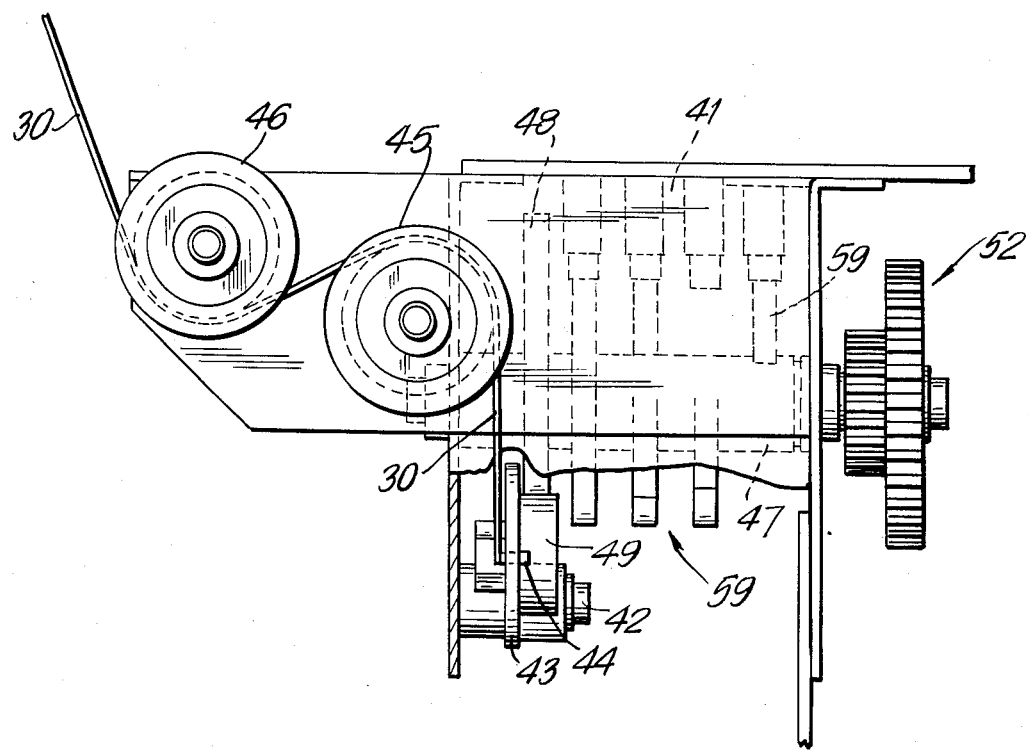
FIG. 8 is a view to show the left side thereof.
Figure 9:
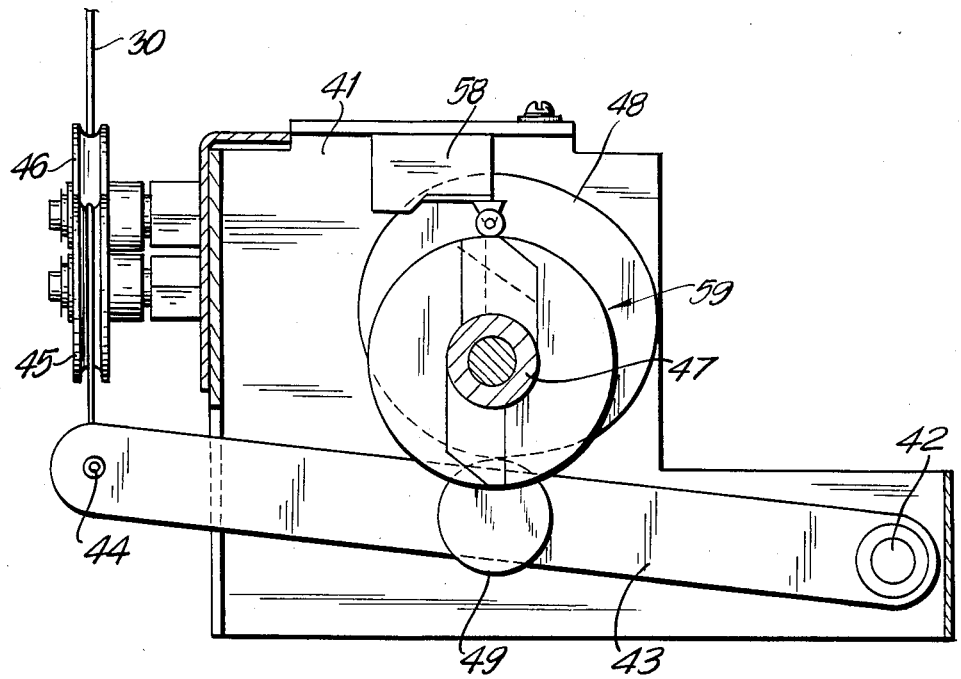
FIG. 9 a cross section of FIG. 7 along the line IX—IX.

As shown in FIGS. 7 through 9, an operating lever 43 is journaled on the base thereof by a pin 42 with frame plates 41 which are integral with the main body 11. The aforementioned wire 30 is connected to the tip end of the lever 43 via a clasp 44. The wire 30 is suspended around a pair of directional rollers 45, 46 which are rotatably attached to the frame plates 41. A cam roller 49 is mounted in rotatable fashion to the center portion of the lever 43. The cam roller 49 abuts on a cam plate 48 which is integral with a cam shaft 47 supported by the frame plates 41 in rotatable fashion. As the cam shaft 47 rotates, the cam plate 48 comes to abut on the cam roller 49, thereby rotating in a vertical direction around the pin 42 to move the wire 30 as shown in FIG. 9.

As shown in FIG. 10, the cam shaft 47 is connected to an output shaft 51 of a motor 50 provided on the main body 11 via a reduction gear train 52. The output shaft 51 of the motor 50 is connected to a paper feeding section 55 or the electrophotographic processing section 56 of the electrophotographic copier (not shown) via timing chains 53, 54 to drive them. The electrophotographic copier may be the one which uses copy paper coated with sensitizer or one having a transfer process. The reference numeral 59 denotes dogs which actuate a limit switch 58 for sequence control attached to frame plates 41 respectively. Each dog is secured on the cam shaft 47.

Accordingly, for every one copying operation, the cam shaft 47 is rotated once to thereby actuate sequentially the limit switch 58 with dogs 59. At the same time, the mirror 22 is forced upward and the slide base 35 is displaced. Exposure process is started at the state where the filter 40 is positioned immediately above the lens 18 to restore the projection state.

Although a motor 50 is used to drive the switching mirror 22 and the slide base 35 in the above description, either a solenoid or air cylinder may be used. Alternatively it may be manually operated. Although the slide base 35 is moved linearly hereinabove, it may have a structure which allows rotation similar to the switching mirror 22. In the reader/printer, a microfilm 15 of the transmittance type is used as the image recording medium, but the medium of the reflectance type may be used by changing the illumination system.

We claim:

1. A reader-printer comprising: a lens provided on a main body for magnifying image information recorded on a recording medium, a projection screen provided on said main body for receiving said image information in enlarged size, an electrophotographic copier housed in said main body and having an exposure surface, means for focussing said enlarged image information on said exposure surface, a switching mirror provided on said main body for switching an optical path extending from said lens selectively to one of said projection screen and exposure surface, a mirror arranged within said main body and inclined toward said exposure surface, and an optical filter means interposed in said optical path for diminishing the quantity of light where the distance between the exposure surfce and said mirror narrows.

2. A reader-printer as claimed in claim 1, wherein the recording medium is a microfilm.

3. A reader-printer as claimed in claim 1, wherein the electrophotographic copier includes a developing unit for developing with toner the image information exposed on the exposure surface.

4. A reader-printer as claimed in claim 1, wherein the electrophotographic copier includes a transfer device for transferring the image information onto a copy medium via the exposure surface.

5. A reader-printer comprising: a lens provided on a main body for magnifying image information recorded on a recording medium, a projection screen provided on said main body for receiving said image information in enlarged size, an electrophotographic copier housed in said main body and having an exposure surface, means for focussing said enlarged image information on said exposure surface, a switching mirror provided on said main body for switching an optical path extending from said lens selectively to one of said projection screen and exposure surface, a mirror arranged within said main body and inclined toward said exposure surface, and an optical filter means interposed in said optical path for diminishing the quantity of light where the distance between the exposure surface and said mirror narrows, said optical filter means being movably mounted on the main body, and interposed in the optical path at the time of copying operation.

6. A reader-printer as claimed in claim 5, comprising a conversion lens on the side of the optical filter means, for projecting an image information of a magnifying ratio different from that of the copying operation on the projection screen at the time of projection operation.

7. A reader-printer comprising: a lens provided on a main body for magnifying image information recorded on a recording medium, a projection screen provided on said main body for receiving said image information in enlarged size, an electrophotographic copier housed in said main body and having an exposure surface, means for focussing said enlarged image information on said exposure surfce, a switching mirror provided on said main body for switching an optical path extending from said lens selectively to either said projection screen or the exposure surface, a mirror arranged within said main body and inclined toward said exposure surface, and optical filter means interposed in said optical path for diminishing the quantity of light where the distance between the exposure surface and said mirror narrows, and means for moving the switching mirror and the optical filter means together.

8. A reader-printer as claimed in claim 1, wherein said optical means is an optical filter having a different transmission of light by location.

9. A reader-printer as claimed in claim 1, wherein the optical filter means is a mirror reflecting light differently at varying portions thereof.

10. A reader-printer as claimed in claim 1, wherein the optical filter means is a shading plate which shades the part of the optical path where the distance between the exposure surface and said mirror narrow.

* * * * *